(12) United States Patent
Niemelä

(10) Patent No.: US 9,407,761 B2
(45) Date of Patent: Aug. 2, 2016

(54) MANAGING COMMUNICATIONS IN A COMMUNICATION NETWORK

(75) Inventor: Jarno Niemelä, Espoo (FI)

(73) Assignee: F-Secure Corporation, Helsinki (FI)

( * ) Notice: Subject to any disclaimer, the term of this patent is extended or adjusted under 35 U.S.C. 154(b) by 586 days.

(21) Appl. No.: 13/008,105

(22) Filed: Jan. 18, 2011

(65) Prior Publication Data

US 2012/0183130 A1  Jul. 19, 2012

(51) Int. Cl.
*H04M 3/00* (2006.01)
*H04M 3/38* (2006.01)
*H04M 1/677* (2006.01)
*H04M 1/67* (2006.01)

(52) U.S. Cl.
CPC .............. *H04M 3/38* (2013.01); *H04M 1/677* (2013.01); *H04M 1/67* (2013.01); *H04M 2203/6081* (2013.01)

(58) Field of Classification Search
CPC ......... H04M 11/00; H04M 1/66; H04M 3/00; G06F 11/00
USPC .................. 455/403, 466, 406; 379/145, 189, 379/218.01, 265.01, 265.02
See application file for complete search history.

(56) References Cited

U.S. PATENT DOCUMENTS

| | | | | |
|---|---|---|---|---|
| 5,463,681 | A * | 10/1995 | Vaios | H04M 3/38 379/145 |
| 8,312,539 | B1 * | 11/2012 | Nachenberg | G06F 21/554 713/188 |
| 2001/0014094 | A1 * | 8/2001 | Epley | H04L 29/12009 370/392 |
| 2005/0141552 | A1 * | 6/2005 | Schwalb | H04Q 3/0025 370/466 |
| 2006/0020713 | A1 * | 1/2006 | Kobayashi et al. | 709/245 |
| 2006/0253895 | A1 | 11/2006 | Brandofino et al. | 726/2 |
| 2006/0262917 | A1 * | 11/2006 | Marsico | 379/220.01 |
| 2008/0080488 | A1 * | 4/2008 | Marsico | H04L 29/1216 370/352 |
| 2008/0137832 | A1 * | 6/2008 | Heinze | H04L 29/1216 379/220.01 |
| 2010/0166162 | A1 * | 7/2010 | Mueller | H04L 29/06027 379/93.01 |

FOREIGN PATENT DOCUMENTS

| | | | |
|---|---|---|---|
| EP | 0661863 | A2 | 7/1995 |
| EP | 0874515 | A2 | 10/1998 |
| EP | 1976247 | A1 | 10/2008 |

OTHER PUBLICATIONS

International Search Report and Written Opinion for corresponding International Patent Application No. PCT/EP2012/050725 mailed May 3, 2012.

\* cited by examiner

*Primary Examiner* — Myron K Wyche
(74) *Attorney, Agent, or Firm* — Harrington & Smith

(57) ABSTRACT

A method and apparatus for managing communications in a communication network. A telephony device determines that a software application is attempting to contact an E.164 number. It then determines that the E.164 number matches at least one predetermined criterion, such as the E.164 number being a premium rate number or having a different country code to that of the device. The device then sends a query to a reputation server. The query includes information identifying the software application. The device receives a response from the reputation server, the response including a reputation relating to the software application. On the basis of the received reputation relating to the software application, the device can take further action such as preventing contact from being established.

17 Claims, 3 Drawing Sheets

MANAGING COMMUNICATIONS IN A COMMUNICATION NETWORK

TECHNICAL FIELD

The invention relates to the field of managing communications in a communications network.

BACKGROUND

Communications devices such as mobile telephones and personal computers can be used to make telephone calls and send Short Message Service (SMS) messages. The user typically has a subscription with a network provider, who charges the user for calls made or SMS messages sent.

As devices such as mobile telephones become more complex, they can run increasingly complicated software. A problem arises when a software application attempts to place a call or send a SMS message. The call or SMS message may be sent to a telephone number for which a premium charge is billed to the user. This may be without the user's consent if the user is not aware that the software application is placing such a call or sending such a message. Alternatively, it may be with the user's consent, but the user may not be aware that the call/SMS message is sent to a premium rate telephone number.

Software applications use an application called a dialer to place calls or send SMS messages. A dialer may be included as part of software installed by the user. For example, a user may install an application that includes an embedded advert. By clicking on the advert, the dialer is activated which dials a premium rate telephone number. It may not be apparent to the user that clicking on the advert causes the dialer to dial a premium rate telephone number, or that the number is a premium rate telephone number, and so the user may click on the advert several times. He will only be aware that this caused the dialer to call a premium rate telephone number when he is billed, and the bill includes the premium rate charges.

One way to prevent an application from contacting premium rate telephone numbers, either by calling or using SMS, is to use call barring. Many network operators offer a call barring service to their subscribers. The call barring service prevents calls or SMS messages being sent to premium telephone rate numbers. While this effectively stops software applications from contacting telephone premium rate numbers, it also stops the user from contacting a premium telephone rate number that he wishes to contact, and will stop legitimate applications from contacting premium rate telephone numbers. An example of a legitimate application is a call manager application which the user may, for example, programme to send an automatic SMS reply to a received SMS message.

Another way to address the problem is to compare the telephone number that the application is attempting to contact with a blacklist of telephone numbers. If the telephone number matches a telephone number in the blacklist, then the contact is not established. However, this relies on a premium rate telephone number being provisioned in the blacklist.

SUMMARY

It has been realised that a more flexible way of preventing applications from contacting premium rate or other expensive telephone numbers is required that prevents unwanted communications with that number. According to a first aspect, there is provided a method of managing communications in a communication network. A telephony device determines that a software application is attempting to contact an E.164 number. It then determines that the E.164 number matches at least one predetermined criterion. The device sends a query to a reputation server, the query including information identifying the software application. The device receives a response from the reputation server, the response including a reputation relating to the software application. On the basis of the received reputation relating to the software application, the device can take further action.

Examples of the sort of further action that the device can take include:
  preventing the software application from contacting the E.164 number;
  closing the software application; and
  preventing the software application from using any communication services.

These actions ensure that the software application cannot establish contact with another device that might incur high billing charges for the user.

One way of determining that the E.164 number matches at least one predetermined criterion comprises is to compare a portion of numbers contained in the E.164 number with entries in a database. This is because premium numbers in a given country typically have certain number strings that identify them. By matching the number strings, the device can determine whether the number is likely to be a premium number or not.

As an option, the database is stored at the telephony device. Alternatively, the database may be stored at a remote node. In this case, the method comprises sending a message containing at least a portion of numbers contained in the E.164 number to the remote node. The remote node performs a check against the database and sends a response to the device, the response including an indication of whether the E.164 number matches the at least one predetermined criterion.

Another way of determining that the E.164 number matches at least one predetermined criterion is to determine whether the E.164 number includes a country code that differs from the country code of the E.164 number belonging to the telephony device. Calling other countries typically incurs high charges, and so this prevents a software application from making such a call without the user's consent.

A further way of determining that the E.164 number matches at least one predetermined criterion includes determining that the E.164 number is not provisioned in a database of acceptable E.164 numbers. By comparing the number with a blacklist of numbers, the device can be prevented from calling numbers that are known to be suspicious.

There are several ways in which the software application can attempt to contact the E.164 number. It may, for example, attempt to establish a video call, send a Short Message Service message, send a Multimedia Message Service message, or send an Unstructured Supplementary Service Data message.

In order to assist the reputation server in coming to a decision on the reputation of the software application, the query optionally includes further information. This may be, for example, the current time, or an indication of the status of the device. The status of the device and the time can be used to establish the likelihood of the user being involved in the attempt to contact the E.164 number. Other information may include information identifying the source of the software application and the type of contact that the software application is attempting to establish, for example whether it is attempting to send an SMS message or establish a voice call.

Note that the E.164 number may be a regular E.164 number or could be a short code number.

According to a second aspect, there is provided a telephony device for use in a communication network. The device is provided with a processor that is arranged to determine that a software application running at the device is attempting to contact an E.164 number. The processor is further arranged to determine that the E.164 number matches at least one predetermined criterion. A transmitter is provided for sending a query to a reputation server. The query includes information identifying the software application. The device is further provided with a for receiving a response from the reputation server. The response includes a reputation relating to the software application. The processor is arranged to take further action on the basis of the received reputation relating to the software application.

As an option, the processor is arranged to take further action such as:
  preventing the software application from contacting the E.164 number;
  closing the software application; and
  preventing the software application from using any communication services.

As a further option, the processor is arranged to determine that the E.164 number matches at least one predetermined criterion comprises by comparing a portion of numbers contained in the E.164 number with entries in a database. This allows the processor to determine, for example, that the number is likely to be a premium rate number, or includes a country code different to the country code of the E.164 number associated with the device.

In an optional embodiment, the device further comprises a computer readable medium in the form of a memory on which the database is stored.

In an alternative embodiment, the device is provided with a second transmitter for sending a message containing at least a portion of numbers contained in the E.164 number to a remote node, the remote node having access to the database. A second receiver is provided for receiving a response from the remote node, the response including an indication of whether the E.164 number matches at least one predetermined criterion.

The processor is optionally arranged to determine that the E.164 number matches at least one predetermined criterion by determining whether the E.164 number includes a country code that differs from the country code of the E.164 number belonging to the telephony device.

The device optionally comprises a computer readable medium in the form of a memory. The memory stores a database of acceptable E.164 numbers, and the processor is arranged to determine that the E.164 number matches at least one predetermined criterion in part by determining that the E.164 number is not provisioned in the database of acceptable E.164 numbers.

According to a third aspect, there is provided a reputation server for use in a communication network. The reputation server is provided with a receiver for receiving from a telephony device a reputation query. The reputation query includes information identifying a software application that has attempted to contact an E.164 number that matches at least one predetermined criterion. A processor is provided for performing a reputation check on the software application, and a transmitter is provided for sending a response to the telephony device. The response includes a reputation relating to the software application.

Note that the query may include further information in order to assist the reputation server in performing the reputation check. This information can be used to establish the likelihood of the user intervening in contacting the number. For example, if the attempted contact is made late at night when the user is likely to be asleep, then it is unlikely that the user has intervened. Furthermore, if it is established that the device has not been used by the user, for example by determining that the display backlight is not lit, or that the user has not used any user inputs such as the keyboard when the attempt to contact the E.164 number has been made, it is also likely that the user has not intervened in the attempted contact.

The reputation server may also use information such as the source of the software application, and whether the software application itself is trusted or whether the software application has been distributed by an organisation that is trusted. It may also check the E.164 number itself against a database of blacklisted E.164 numbers known to be suspicious.

Furthermore, the reputation server may, when performing a reputation check, take into account the type of contact that the software application is attempting to establish, such as SMS message, voice call, video call, MMS message and so on.

According to a fourth aspect, there is provided a computer program product comprising a computer readable medium on which is stored a computer program, the computer program comprising computer readable code means which, when run on a telephony device, causes the telephony device to perform the method described above in the first aspect.

According to a fourth aspect, there is provided a computer program product comprising a computer readable medium on which is stored a computer program, the computer program comprising computer readable code means which, when run on a reputation server, causes the reputation server to behave as described above in the third aspect.

DETAILED DESCRIPTION

Figure 1:
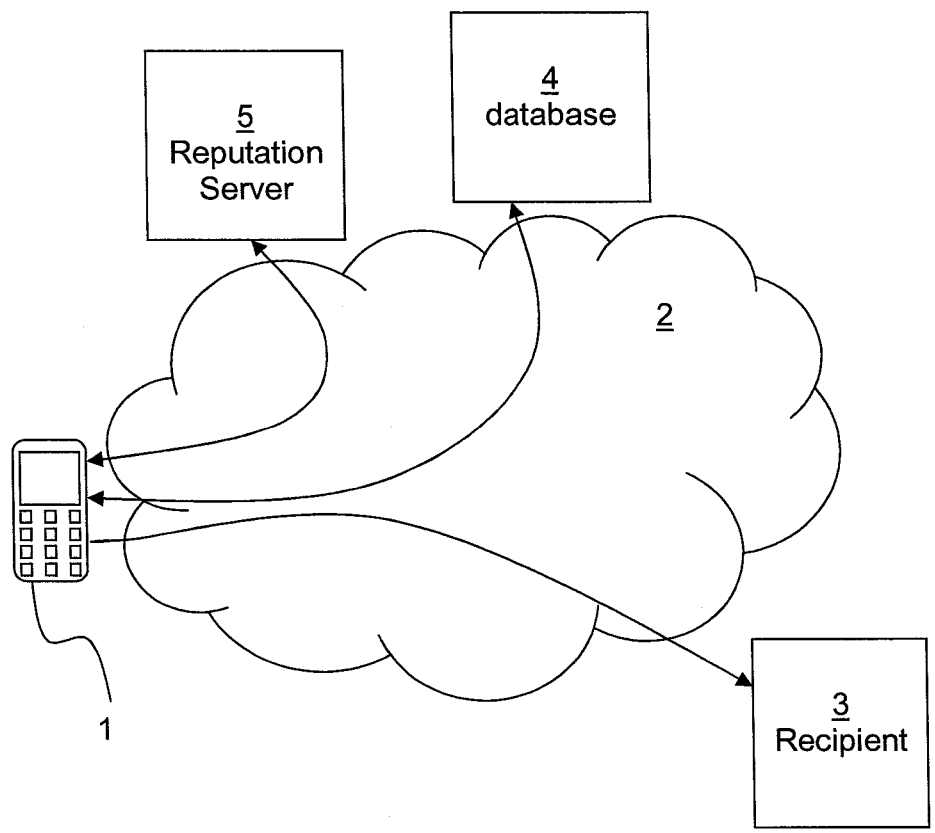
FIG. 1 illustrates schematically in a block diagram a network architecture according to an embodiment of the invention.

Turning to FIG. 1, there is illustrated a telephony device 1 that can send and receive communications via a communications network 2. There is also illustrated a recipient 3 which a software application at the device 1 is attempting to contact. Contact may be made by any means for which the user of the device 1 may be charged. Examples of ways in which the device 1 attempts to contact the recipient include establishing a voice or video call, or sending a message such as an SMS or a Multimedia Message Service (MMS) message, or an Unstructured Supplementary Service Data (USSD) message.

The device 1, before allowing the software application to contact the recipient 3, checks the E.164 number of the recipient to determine whether the E.164 number matches at least on predetermined criterion. Examples of predetermined criteria include the E.164 being a premium rate telephone number that is expensive to contact, or the E.164 number having a country code different to that of the E.164 number of the device 1. In one embodiment, the checking occurs by referring to a database stored locally at the device 1, in an alternative embodiment, the checking occurs by contacting a remote database 4. Note that the E.164 number could be a regular E.164 number or could be a short code.

In the event that the E.164 number matches the predetermined criterion, the device 1 determines the identity of the software application that is attempting to contact the recipient 3, and sends a reputation query to a reputation server 5. The reputation query includes information identifying the software application, which allows the reputation server 5 to perform a check on the reputation of the software application. The reputation server 5 then responds to the device 1 with the results of the reputation check, and the device 1 can take further action. Examples of further action include closing the software application, preventing the software application from making contact with the E.164 number, and preventing the software application from making contact with any E.164 number.

Figure 2:
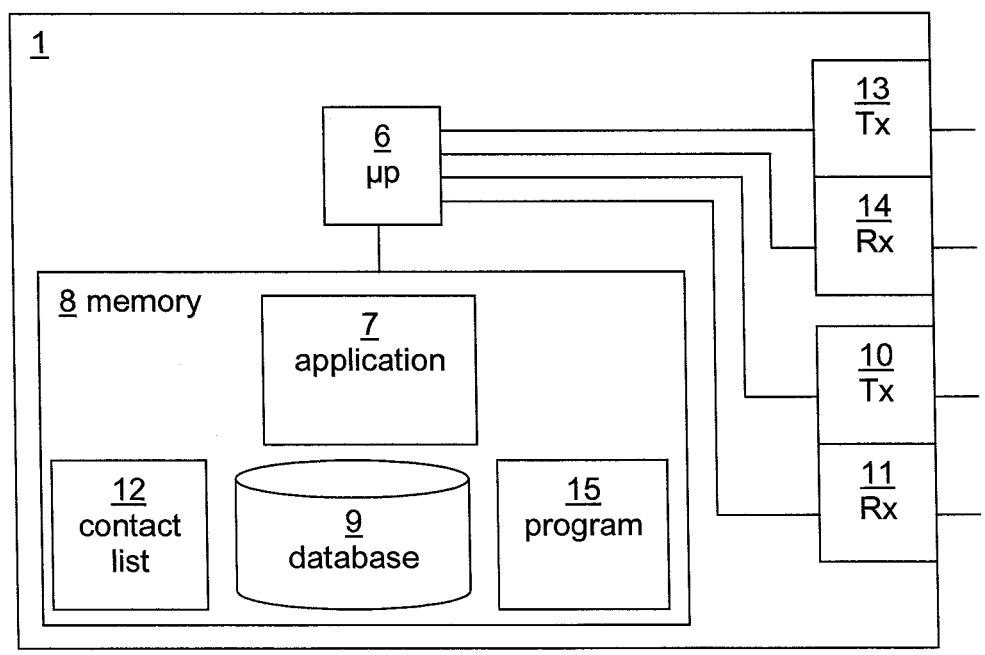
FIG. 2 illustrates schematically in a block diagram a telephony device according to an embodiment of the invention.

FIG. 2 illustrates a telephony device 1 according to an embodiment of the invention. The device is provided with a processor 6 that can run a software application 7. A computer readable medium in the form of a memory 8 is provided. The memory may be used to store computer code for the software application 7.

When the software application 7 is running, it attempts to contact the recipient 3 as described above. The processor 6 determines that the application 7 is attempting to contact the recipient 3. This may be done in one of a number of ways. For example, a hooking rule may be established to hook operating system telephony and messaging functions. Alternatively, the SMS or email outbox could be monitored. There are other ways of determining that the application 7 is attempting to contact the recipient, and the two ways described above are by way of example only.

When the processor determines that the software application 7 is attempting to contact the recipient, it obtains the E.164 number that the software application is attempting to contact. The processor 6 checks to see if the E.164 number matches at least one predetermined criterion. A predetermined criterion may be, for example, determining that the E.164 number is a premium rate telephone number, or that it has a country code different to that of the E.164 number of the device 1.

Taking the example of the E.164 number being a premium rate telephone number, this can be done quite simply. Premium rate telephone numbers in most countries are well structured, and typically include a string of numbers towards the start of the E.164 number. For example, the E.164 number +44 870 123456 comprises a country code (44) and a string of number (870) that identifies the number as a non-geographic specific premium rate telephone number. If the E.164 number that the software application 7 is attempting to contact includes the 870 string of numbers in the same position, then it is likely to be a premium rate number.

There are several ways in which the processor 6 can determine that the E.164 number is a premium rate number. In one embodiment, a database 9 of premium rate number identifiers can be maintained at the device 1. In an alternative embodiment, the processor 6 can use a transmitter 10 to send a query to the remote database 4. A receiver 11 is arranged to receive a response from the remote database 4 indicating whether or not the number is a premium rate number.

A further criterion can be applied by using acceptable E.164 numbers stored in a contacts list 12 at the device. If the E.164 number that the software application 7 is attempting to contact is in the contacts list 12, then it is likely that the user is agreeable to the software application 7 attempting to contact the E.164 number. In this case, the attempt to contact the E.164 number will be allowed.

In an optional embodiment, the further criterion may include the user not having a significant amount of contacts with numbers from a specific country in his contacts list 12. For example, if the application 7 is attempting to contact an E.164 number having a country code different to that of the device, the processor 6 can check to determine if the user has a predetermined number of contacts with the same country code as the E.164 number that the application 7 is attempting to contact. If a sufficient number of contacts with that country code exist, then the further criterion is not met and the call is allowed to be established.

The first step of determining the E.164 number matches a predetermined criterion is used to establish the likelihood of the application attempting to contact an undesirable number. If this is established, then a check must be made on the reputation of the application, typically using a reputation query protocol. In this case a transmitter 13 is used to send a reputation query to a reputation server 5, such as a Network Reputation Services (NRS) server. The reputation query includes information identifying the software application 7 attempting to contact the E.164 number. This identifying information may include any of a file name, file location, hash value and so on. Further information may also be included. For example, it may include an indication of the type of operation attempted, such as whether the contact is a call or an SMS. Other information may include the local time. Information may also be included to identify whether a device screen lock/backlight or active or not. This can help to establish whether or not the user is directly attempting to contact the E.164 number, or if the contact is being attempted without user intervention. Further information may include the time from the latest user key-press or other user interface event. Further information may include an indication of the origin of the application attempting to contact the E.164 number. An application obtained from a third party market or direct HTTP download will be less trusted than one obtained official application store. The further information can all be used to assist in establishing whether or not the user is using the device at the moment, or whether the application is dialing on it's own in middle of night while user is likely to be sleeping.

The reputation server 5 performs a check on the reputation of the software application 7. The reputation of the software application may be determined by many factors. For example, if not many instances of the software application 7 are known, then the software application 7 may have a reduced reputation. If it is known that the software application has been distributed by, or is otherwise linked to spam communications, then the software application will have a reduced reputation. If it is known that the software application 7 does not accept much user input then it may have a reduced reputation. It will be apparent to a skilled person that many different factors may affect the reputation of the software application 7, and the above are provided as examples only.

Once the reputation check has been performed, the reputation server 5 sends a response to the device 1. The response is received by the device 1 at a receiver 14, and includes reputation information for the software application 7. The reputation information may be, for example, "good" if the software application 7 is known to be a legitimate application, "bad" if the software application 7 is known to be a suspicious application, and "unknown" if the software application 7 is unknown to the reputation server 5.

The processor 6 is arranged to take further action depending on the received reputation information. If the reputation information implies that the software application 7 is a legitimate application, then the processor will allow the software application 7 to contact the E.164 number. If the reputation information implies that the software application is suspicious or unknown, then the processor 6 may take action to prevent the software application from contacting the E.164 number. This may include, for example, preventing the software application from contacting the E.164 number in this specific instance, closing the software application completely, and preventing software application from using any communication services such as contacting any E.164 number. The processor may also pass details about the software application to an anti-virus application (not shown) for further checks on the software application 7. Furthermore, a dialogue may be displayed to the user of the device 1 informing the user that a suspicious or unknown software application 7 has attempted to contact an E.164 number. The dialogue may give the user the option to allow the software application 7 to contact the E.164 number despite the warnings given to the user.

A program 15 may be stored in the memory 8 which, when executed by the processor 6, causes the device 1 to behave as described above.

Figure 3:
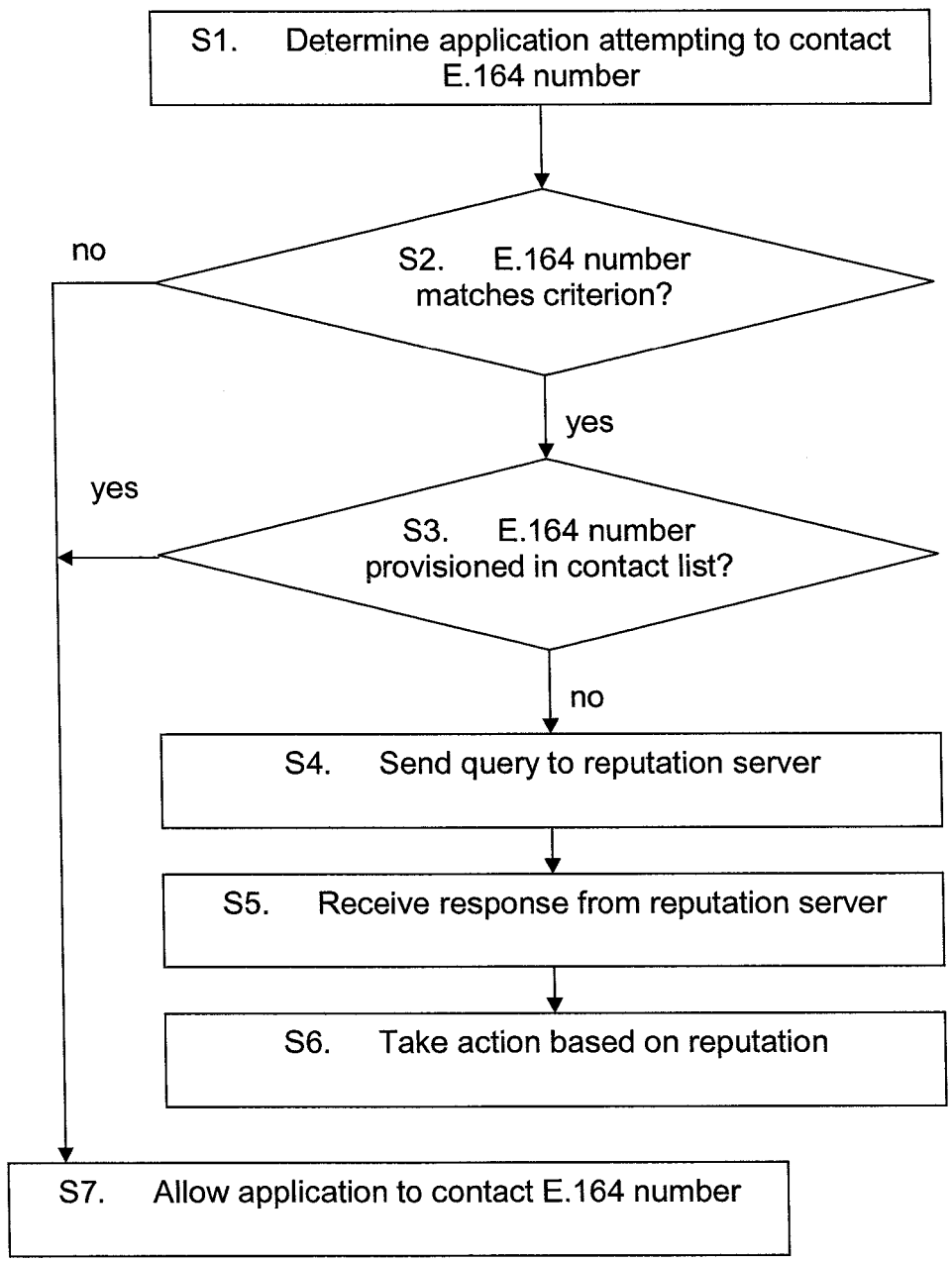
FIG. 3 is a flow diagram showing the steps of an embodiment of the invention.

FIG. 3 is a flow diagram showing key aspects of an embodiment of the invention. The following numbering corresponds to the numbering of FIG. 3:

S1. The device 1 determines that the software application 7 running on the device is attempting to contact an E.164 number.

S2. A determination is made that the E.164 number matches a predetermined criterion, such as the E.164 number being a premium rate telephone number or the E.164 number having a country code different to the E.164 number of the device 1. If so, then the procedure proceeds at step S3, if not then the procedure proceeds at step S7.

S3. In an embodiment of the invention, a check is made to determine whether the E.164 number matches a number in a contacts list 12 stored at the device 1. If not, then the procedure proceeds to step S4, if so then the procedure proceeds to step S7. Note that the order of steps S2 and S3 can be reversed.

S4. The device 1 sends a query to the reputation server 5, the query including information identifying the software application 7.

S5. The device 1 receives a response from the reputation server, the response indicating the reputation of the software application 7. As an further option, the response may include an indication of whether the application is trusted. In this case, the reputation server checks for trusted system applications, or applications distributed by organizations that the reputation server considers to be trustworthy.

S6. The device 1 takes further action on the basis of the reputation of the software application. As described above, this may include closing the software application 7, preventing the software application 7 from contacting the E.164 number, preventing the software application 7 from using any communication services, and passing details of the software application 7 to an anti-virus application.

S7. If the E.164 number does not match a predetermined criterion, or is provisioned in a contacts list 12 at the device 1, then the software application 7 is allowed to contact the E.164 number.

Figure 4:
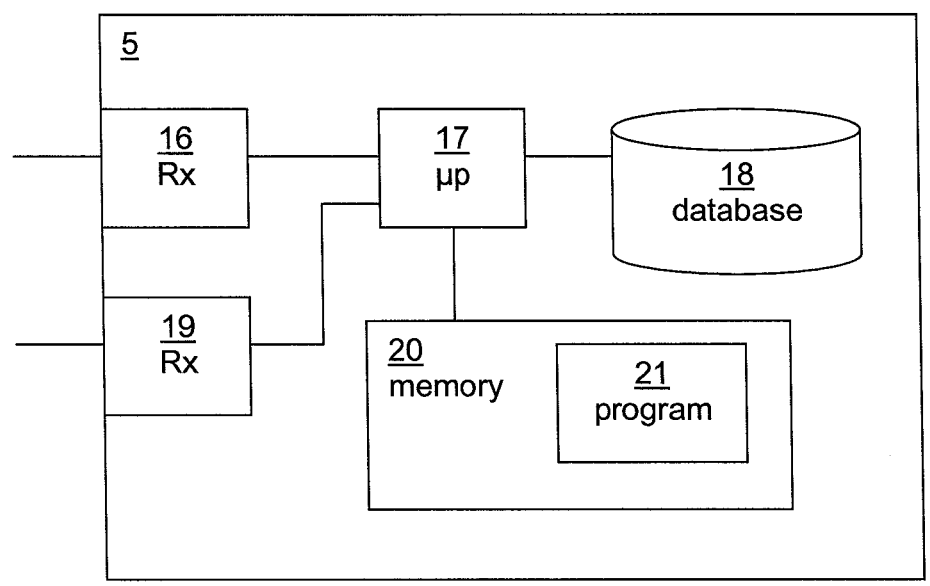
FIG. 4 illustrates schematically in a block diagram a reputation server according to an embodiment of the invention.

Referring to FIG. 4, there is shown a reputation server 5 such as a NRS. The reputation server 5 is provided with a receiver 16 for receiving a reputation query from the device 1, which has identified that the software application 7 at the device is attempting to contact an E.164 number that matches a predetermined criterion. The reputation query includes information identifying the software application 7.

A processor 17 is provided for performing a reputation check no the software application. This may involve querying a database 18, which may be located at the reputation server 5, or at a remote node. In FIG. 4, the database 18 is shown as being located at the reputation server 5. The reputation check can be made as described above.

Once the reputation check has been made, the reputation server 5 sends a response to the device 1 using a transmitter 19, the response including a reputation relating to the software application.

The reputation server 5 may also be provided with a computer readable medium in the form of a memory 20, which can be used to store a program 21. When the program 21 is run by the processor 17, it causes the reputation server 5 to behave as described above.

In a further embodiment of the invention, the E.164 number itself may also have its reputation checked, for example against a blacklist of E.164 numbers. Furthermore, if the software application 7 is found to be suspicious then the E.164 number that it is trying to contact may be provisioned in a database of blacklisted E.164 numbers.

The invention allows a device to prevent a software application from contacting an undesirable E.164 number, such as a premium rate number or a number with a different county code to that of the E.164 number associated with a device. The invention allows the device to take action against the software application itself, and not just prevent the software application from contacting the E.164 number. However, it still allows the device to contact E.164 numbers that may be expensive to contact, and gives the user some freedom in selecting allowable numbers by provisioning them in a contact list. By first looking at the E.164 number that the software application is attempting to contact, false alarms can be reduced while unknown or suspicious software applications are prevented from performing expensive operations such as contacting premium E.164 numbers.

It will be appreciated by the person of skill in the art that various modifications may be made to the above-described embodiments without departing from the scope of the present invention.

The following abbreviations have been used in this description:
MMS Multimedia Message Service
NRS Network Reputation Services
SMS Short Message Service
USSD Unstructured Supplementary Service Data

The invention claimed is:
1. A method comprising:
   at a telephony device, determining that a software application invoked by the telephony device is attempting to contact an E.164 number;
   determining that the E.164 number matches at least one predetermined criterion, wherein the determination comprises a comparison of a segment of the digits comprising the E.164 number against entries in a database, wherein the segment of the digits compared is less than all of the digits;
   in response to the determination that the E.164 number matches the at least one predetermined criterion, sending a query to a reputation server, the query including information identifying the software application;
   receiving a response from the reputation server, the response including a reputation relating to the reputation of the software application as a legitimate application, the reputation indicating whether or not the software application's status as a legitimate application is suspicious or unknown; and on the basis of the received reputation relating to the software application, taking further action.

2. The method according to claim 1, wherein the further action comprises any of preventing the software application from contacting the E.164 number, closing the software application, and preventing the software application from using any communication services.

3. The method according to claim 1, wherein the database is stored at the telephony device.

4. The method according to claim 1, wherein the database is stored at a remote node, the method comprising sending a message containing at least a portion of numbers contained in the E.164 number to the remote node, and receiving a response from the remote node, the response including an indication of whether the E.164 number matches at least one predetermined criterion.

5. The method according to claim 1, wherein the determination that the E.164 number matches at least one predetermined criterion comprises determining whether the E.164 number includes a country code that differs from the country code of the E.164 number belonging to the telephony device.

6. The method according to claim 1, wherein the determination that the E.164 number matches at least one predetermined criterion includes determining that the E.164 number is not provisioned in a database of acceptable E.164 numbers.

7. The method according to claim 1, wherein the software application is attempting to contact the E.164 number by any of establishing a voice call, establishing a video call, sending a Short Message Service message, sending a Multimedia Message Service message, and sending an Unstructured Supplementary Service Data message.

8. The method according to claim 1, wherein the query includes further information selected from any of time, an indication of the status of the device, information identifying the source of the software application and the type of contact that the software application is attempting to establish.

9. An apparatus comprising:
at least one processor;
memory storing a program of instructions;
wherein the memory storing the program of instructions is configured, with the at least one processor, to cause the apparatus to at least:
determine that a software application invoked by a telephony device is attempting to contact an E.164 number, wherein the determination comprises a comparison of a segment of the digits comprising the E.164 number against entries in a database, wherein the segment of the digits compared is less than all of the digits;
determine that the E.164 number matches at least one predetermined criterion;
in response to the determination that the E.164 number matches the at least one predetermined criterion, submit a query to a reputation server, the query including information identifying the software application;

evaluate a response from the reputation server, the response including a reputation relating to the reputation of the software application as a legitimate application, the reputation indicating whether or not the software application's status as a legitimate application is suspicious or unknown; and take further action on the basis of the received reputation relating to the software application.

10. The apparatus according to claim 9, apparatus is caused to take further action comprising any of preventing the software application from contacting the E.164 number, closing the software application, and preventing the software application from using any communication services.

11. The apparatus according to claim 9, wherein the apparatus further comprises a computer readable medium in the form of a memory on which the database is stored.

12. The apparatus according to claim 9, wherein the apparatus is further caused to:
submit a message containing at least a portion of numbers contained in the E.164 number to a remote node, the remote node having access to the database; and
evaluate a response from the remote node, the response including an indication of whether the E.164 number matches at least one predetermined criterion.

13. The apparatus according to claim 9, wherein the apparatus is caused to determine that the E.164 number matches at least one predetermined criterion by determining whether the E.164 number includes a country code that differs from the country code of the E.164 number belonging to the telephony device.

14. The apparatus according to claim 9, further comprising a computer readable medium in the form of a memory, the memory storing a database of acceptable E.164 numbers, wherein the processor is arranged to determine that the E.164 number matches at least one predetermined criterion in part by determining that the E.164 number is not provisioned in the database of acceptable E.164 numbers.

15. A computer program product comprising a non-transitory computer readable medium on which is stored a computer program, the computer program comprising computer readable code which, when executed by a processor, causes the telephony device to perform the method of claim 1.

16. The method of claim 1, further comprising, in response to receiving from the reputation server a response to the query including a reputation relating to the reputation of the software application as a legitimate application and indicating that the software application's status as a legitimate application is suspicious or unknown; and
on the basis of the received reputation relating to the software application, taking further action.

17. The method of claim 16, wherein the at least one predetermined criterion is one or more of:
the country code of the E.164 number differs from the country code associated with the telephony device;
the E.164 number has a prefix indicating that the E.164 number is a premium number.

* * * * *